Patented June 21, 1927.

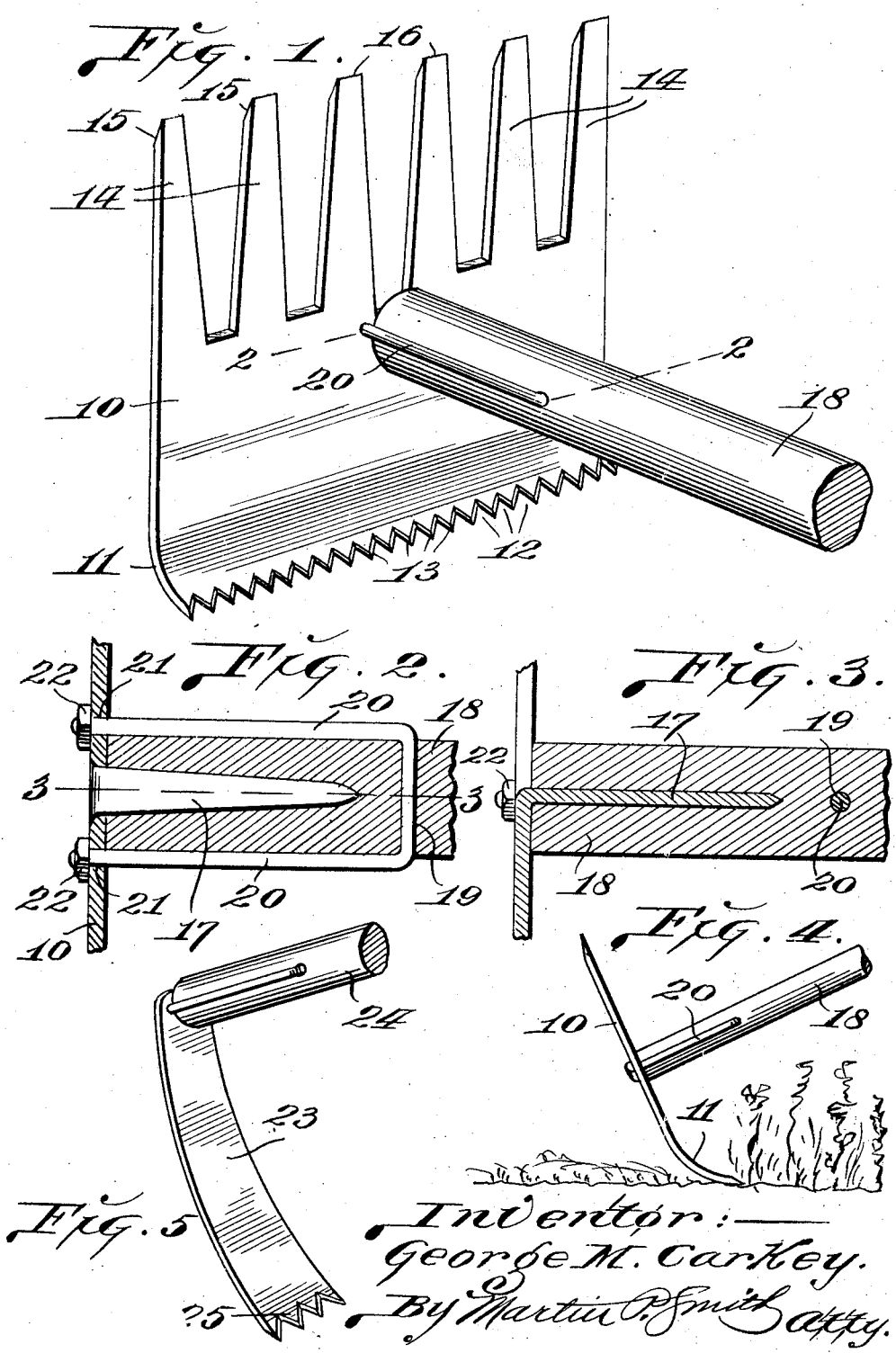

1,632,883

UNITED STATES PATENT OFFICE.

GEORGE M. CARKEY, OF LOS ANGELES, CALIFORNIA.

COMBINED WEED CUTTER AND CULTIVATOR.

Application filed September 16, 1926. Serial No. 135,766.

My invention relates to a lawn or garden implement and has for its principal object the provision of a relatively simple, practical and easily handled tool, and which, when properly manipulated, may be effectively used as a hoe or rake, for cutting weeds and grass at the surface of the ground, or for cutting the roots of weeds and like growth below the surface of the ground.

A further object of my invention is to provide improved means for firmly securing the blade or body of the tool or implement to the handle thereof.

With the foregoing and other objects in view, my invention consists in certain novel features of construction and arrangement of parts that will hereinafter be more fully described and claimed and illustrated in the accompanying drawing, in which—

Fig. 1 is a perspective view of a garden implement of my improved construction.

Fig. 2 is an enlarged horizontal section taken approximately on the line 2—2 of Fig. 1.

Fig. 3 is a vertical section taken on the line 3—3 of Fig. 2.

Fig. 4 is an elevational view showing the position of the tool when the same is used for cutting grass or weeds immediately above the surface of the ground.

Fig. 5 is a perspective view of a modified form of the implement and which is especially designed for use in cutting the roots of weeds and like growth below the surface of the ground.

Referring by numerals to the accompanying drawings, and particularly to the form of implement illustrated in Figs. 1 to 4 inclusive, 10 designates a plate, preferably of steel, that forms the body of the implement and a portion of this plate near one edge is curved slightly as designated by 11. The edge of the plate adjacent to this curved portion is provided with relatively small V-shaped notches 12, thus forming between said notches V-shaped teeth 13 and the edges of these teeth are beveled so as to form sharp cutting edges.

That portion of the plate 10 opposite the curved edge that is provided with the teeth 13 is notched or slotted so as to provide a series of relatively long teeth 14 that are similar to the teeth of a rake, and these teeth gradually taper in width toward their outer ends and their terminal portions are beveled on the outside as designated by 15 so as to form sharp cutting edges 16.

That portion of the metal that is cut from between the central pair of teeth 14 is bent downwardly so as to occupy a plane at right angles to the plane occupied by the body 10 of the implement, thus forming a shank or prong 17 that projects outwardly from the central portion of the plate and this prong is driven into the end of a handle 18 of wood.

In order to firmly secure the handle to the implement body 10 the central portion of a metal rod or heavy wire is positioned in a diametrically disposed aperture 19 that is formed in handle 18 just beyond the end of shank 17 and the end portions 20 of this rod or wire are bent so as to lie alongside the handle 18, thus forming a substantially U-shaped member. The ends of the legs of this U-shaped member pass through apertures 21 that are formed in the plate 10 to the sides of prong 17 and said ends may receive nuts such as 22 or said ends may be riveted into the apertures 21. Thus the shank 17 and U-shaped member combine to provide a very firm and substantial connection between the handle 18 and the body of the implement.

My improved implement may be used as a hoe when the edge having the teeth 13 is placed on the ground, or by reversing the position of the implement so as to position the lower ends of the teeth 14 on the ground, the implement may be used as a rake.

To cut grass or weeds in a plane just above the surface of the ground, the implement is manipulated so that the handle occupies a position approximately 15° or 20° to one side of a vertical plane as illustrated in Fig. 4 and when so positioned, the curved portion 11 of the plate 10, and which curved portion terminates in the sharpened V-shaped teeth 13, may be moved with a quick scythe-like motion over the surface of the ground, thereby cutting grass, weeds, and like growth.

In Fig. 5, I have illustrated a form of tool that is particularly designed for cutting the roots of weeds and like growth below the surface of the ground and this tool comprises a tool body 23 of metal which may be an inch or an inch and a half in width and approximately seven or eight inches in length. The upper end of this tool body may be connected to a handle 24 in any suitable manner, but preferably by means of a shank and U-shaped bolt similar to the shank and bolt used in attaching the plate 10 to the handle 18. The free end of member 23 is provided with four or five V-shaped teeth 25, the edges of which are beveled so as to produce cutting edges.

When this form of tool is used the curved blade 23 is forced into the ground adjacent to the base of a weed or like growth and as said tool is pressed into the ground it is guided so that the sharp teeth 25 will cut the root of the weed or like growth several inches below the surface of the ground and the stalk of the weed may now be easily removed.

Thus it will be seen that I have provided a relatively simple, practical and easily handled tool that may be used in the garden or on the lawn, and which tool includes means for very rigidly connecting the blade or body of the tool to the handle thereof.

It will be understood that minor changes in the size, form and construction of the various parts of my improved implement may be made and substituted for those herein shown and described without departing from the spirit of my invention, the scope of which is set forth in the appended claim.

I claim as my invention:

In a combined weed cutter and cultivator, a plate having a portion of its body near one edge curved slightly to the side of the plane occupied by the main body portion of the plate, the edge of said plate adjacent to said curved portion being provided with a row of relatively small V-shaped teeth having beveled cutting edges, a series of straight prongs projecting from the opposite edge of said plate, a prong formed integral with and projecting at right angles from the center of said plate and a handle secured to said prong.

In testimony whereof I affix my signature.

GEORGE M. CARKEY.